(12) United States Patent
Hughes et al.

(10) Patent No.: US 12,018,180 B2
(45) Date of Patent: Jun. 25, 2024

(54) FIRE RESISTANT ADHESIVE COMPOSITIONS AND METHODS OF PREPARING AND USING THE SAME

(71) Applicant: ARMSTRONG WORLD INDUSTRIES, INC., Lancaster, PA (US)

(72) Inventors: John E. Hughes, Lincoln University, PA (US); Linzhu Zhang, Ephrata, PA (US); Michelle X. Wang, Lititz, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 18/108,592

(22) Filed: Feb. 11, 2023

(65) Prior Publication Data

US 2023/0257631 A1 Aug. 17, 2023

Related U.S. Application Data

(60) Provisional application No. 63/309,404, filed on Feb. 11, 2022.

(51) Int. Cl.
   *C09J 1/02* (2006.01)
   *C09J 11/06* (2006.01)
   *C09J 11/08* (2006.01)

(52) U.S. Cl.
   CPC ............... *C09J 1/02* (2013.01); *C09J 11/06* (2013.01); *C09J 11/08* (2013.01); *C09J 2400/306* (2013.01)

(58) Field of Classification Search
   None
   See application file for complete search history.

(56) References Cited

U.S. PATENT DOCUMENTS

| | | |
|---|---|---|
| 4,066,463 A | 1/1978 | Chollet |
| 11,365,322 B2 | 6/2022 | Zhang et al. |
| 2009/0118410 A1* | 5/2009 | Herbiet .............. C01F 7/02 423/629 |
| 2010/0280162 A1* | 11/2010 | Stesikova ............ C09D 7/45 106/311 |
| 2018/0258638 A1 | 9/2018 | Hughes et al. |
| 2018/0346738 A1* | 12/2018 | Zhang ................ C09D 5/022 |
| 2020/0369893 A1 | 11/2020 | Zoitos |
| 2021/0040680 A1 | 2/2021 | Matsumoto |
| 2021/0047524 A1 | 2/2021 | Hughes |
| 2022/0289987 A1 | 9/2022 | Zhang et al. |

FOREIGN PATENT DOCUMENTS

| | | |
|---|---|---|
| CN | 110540805 A | 12/2019 |
| CN | 112358818 A | 2/2021 |
| KR | 20180031110 A | 3/2018 |
| WO | WO 2018222825 A1 | 12/2018 |

OTHER PUBLICATIONS

International Search Report issued in PCT/US2023/012861.

* cited by examiner

*Primary Examiner* — Ramsey Zacharia
(74) *Attorney, Agent, or Firm* — Patrick Sheldrake

(57) ABSTRACT

Described herein is a fire-resistant adhesive coating composition which emits water vapor when exposed to fire. Such compositions comprise an ionic polyacrylate dispersant, aluminum hydroxide, silicate, and an alkoxylated alcohol. In certain embodiments, the composition comprises a solids content of at least about 44.2%, based on the wet weight of the composition. Also described herein are methods for making and using of such coating compositions.

18 Claims, No Drawings

FIRE RESISTANT ADHESIVE COMPOSITIONS AND METHODS OF PREPARING AND USING THE SAME

CROSS-REFERENCE TO RELATED APPLICATIONS

This application claims the benefit of U.S. Provisional Patent Application No. 63/309,404 filed on Feb. 11, 2022. The disclosure of the above application is incorporated herein by reference in its entirety for all purposes.

FIELD OF THE DISCLOSURE

The present disclosure relates to fire resistant coating compositions, and more particularly to fire resistant coating compositions which emit water vapor when exposed to fire.

BACKGROUND

Most fire retardant adhesives use organic technology to produce char; however, this may also create a large volume of smoke. Typical components include halogenated compounds, such as brominated or chlorinated compounds. In addition, antimony compounds may be included in order to enhance performance of the halogenated compounds. Unfortunately, all of these chemicals either produce smoke, utilize hazardous chemicals in them, or have hazardous chemicals emitted when burned.

Thus, there is a need for fire resistant adhesive compositions that emit non-hazardous gases when burned. Embodiments of the present invention are directed to meeting these needs.

SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

In some embodiments, the present invention provides for a fire-resistant adhesive coating composition comprising an ionic polyacrylate dispersant; aluminum hydroxide; silicate; and an alkoxylated alcohol. In certain embodiments, the composition has a solids content of at least about 44.2%, based on the wet weight of the composition. In certain embodiments, the composition has a solids content from about 44.0% to about 85%, about 44.0% to about 70%, or about 44.2% to about 65%, based on the wet weight of the composition. In certain embodiments, the composition has a solids content of about 44.2%, based on the wet weight of the composition. In certain embodiments, the ionic polyacrylate dispersant comprises an alkali metal. In certain embodiments, the alkali metal is selected from sodium or potassium. In certain embodiments, the ionic polyacrylate dispersant is present from about 0.02% to about 0.2%, based on the dry weight of the composition. In certain embodiments, the ionic polyacrylate dispersant is present from about 0.02% to about 0.1%, based on the dry weight of the composition. In certain embodiments, the silicate comprises an alkali metal. In certain embodiments, the alkali metal is selected from sodium or potassium. In certain embodiments, the silicate is present from about 65.0% to about 85.0%, from about 70.0% to about 80.0%, or from about 70.0% to about 75.0%, based on the dry weight of the composition. In certain embodiments, the silicate has a pH from about 11.0 to about 12.5, from about 11.5 to about 12.0, or about 11.7. In certain embodiments, the aluminum hydroxide is present from about 20.0% to about 35.0%, from about 20.0% to about 30.0%, or from about 22.0% to about 28.0%, based on the dry weight of the composition. In certain embodiments, the aluminum hydroxide has an oil absorption from about 25 to about 45 ml/100 g, from about 30 to about 40 ml/100 g, or from about 33 to about 35 ml/100 g. In certain embodiments, the alkoxylated alcohol is non-ionic. In certain embodiments, the alkoxylated alcohol is ethoxylated and propoxylated. In certain embodiments, the alkoxylated alcohol comprises C8 to C10 alcohols. In certain embodiments, the alkoxylated alcohol has a pH from about 6.0 to about 8.0, has an initial boiling point of about 200° C., or has a pH from about 6.0 to about 8.0 and has an initial boiling point of about 200° C. In certain embodiments, the alkoxylated alcohol is present from about 0.7% to about 2.0%, from about 0.9% to about 1.5%, or from about 0.9% to about 1.3%, based on the dry weight of the composition. In certain embodiments, the invention is directed to a building panel comprising any one of the fire-resistant adhesive coating compositions as described herein. In certain embodiments, the panel is made of wood.

In other embodiments, the present invention provides for a method for producing a building panel comprising a fire-resistant adhesive coating composition, the fire-resistant adhesive coating composition comprising an aqueous liquid solvent; an ionic polyacrylate dispersant; aluminum hydroxide; silicate; and an alkoxylated alcohol; the method comprising coating a building panel with the fire-resistant adhesive coating composition; and drying the fire-resistant adhesive coating composition to evaporate the aqueous liquid solvent; wherein, in certain embodiments, the coating composition has a solids content of at least about 44.0%, based on the wet weight of the composition. In certain embodiments, the coating composition has a solids content from about 44.0% to about 85%, about 44.0% to about 70%, or about 44.2% to about 65%, based on the wet weight of the composition. In certain embodiments, the coating composition has a solids content of about 44.2%, based on the wet weight of the composition. In certain embodiments, the ionic polyacrylate dispersant comprises an alkali metal. In certain embodiments, the alkali metal is selected from sodium or potassium. In certain embodiments, the ionic polyacrylate dispersant is present from about 0.02% to about 0.2%, based on the dry weight of the composition. In certain embodiments, the ionic polyacrylate dispersant is present from about 0.02% to about 0.1%, based on the dry weight of the composition. In certain embodiments, the silicate comprises an alkali metal. In certain embodiments, the alkali metal is selected from sodium or potassium. In certain embodiments, the silicate is present from about 65.0% to about 85.0%, from about 70.0% to about 80.0%, or from about 70.0% to about 75.0%, based on the dry weight of the composition. In certain embodiments, the silicate has a pH from about 11.0 to about 12.5, from about 11.5 to about 12.0, or about 11.7. In certain embodiments, the aluminum hydroxide is present from about 20.0% to about 35.0%, from about 20.0% to about 30.0%, or from about 22.0% to about 28.0%, based on the dry weight of the composition. In certain embodiments, the aluminum hydroxide has an oil absorption from about 25 to about 45 ml/100 g, from about 30 to about 40 ml/100 g, or from about 33 to about 35 ml/100 g. In certain embodiments, the alkoxylated alcohol is non-ionic. In certain embodiments, the alkoxylated alcohol is ethoxylated and propoxylated. In certain embodiments, the alkoxylated alcohol comprises C8 to C10 alcohols. In certain embodiments, the alkoxylated alcohol has a pH from about 6.0 to about 8.0, has an initial boiling point of about 200° C., or has a pH from about 6.0 to about 8.0 and has an initial boiling point of about 200° C. In certain embodiments, the alkoxylated alcohol is present from about 0.7% to about 2.0%, from about 0.9% to about 1.5%, or from about 0.9% to about 1.3%, based on the dry weight of the composition. In certain embodiments, the panel is made of wood.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DETAILED DESCRIPTION

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight of the total composition. Unless otherwise specified, reference to a molecule, or to molecules, being present at a "wt. %" refers to the amount of that molecule, or molecules, present in the composition based on the total weight of the composition.

The phrase "dry weight" refers to the weight of a referenced component, or components, without the weight of any liquid carrier (which may also be referred to herein as an aqueous liquid solvent). The dry weight may refer to the coating having a solids content of at least about 99 wt. %, based on the total weight of the coating—such amount may allow for minor amounts (up to about 1 wt. %) of residual liquid carrier that may be present in the coating after drying. Thus, when calculating the weight percentages of components in the dry weight, the calculation should be based solely on the solid components (such as, but not limited to the binder, filler, fibrous material, etc.) and should exclude any amount of residual carrier (e.g., water, VOC solvent) that may still be present from a wet-state. According to the present invention, the phrase "wet weight" may be used to indicate a component, or components, that contains a carrier.

According to the present application, use of the term "about" in conjunction with a numeral value refers to a value that may be +/−5% of that numeral. As used herein, the term "substantially free" is intended to mean an amount less than about 5.0 wt. %, less than 3.0 wt. %, 1.0 wt. %; preferably less than about 0.5 wt. %, and more preferably less than about 0.25 wt. % of the composition.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing (if applicable) under discussion. These relative terms are for convenience of description only and do not require that the apparatus be constructed or operated in a particular orientation.

As used herein, terms such as "attached," "affixed," "connected," "coupled," "interconnected," and the like refer to a relationship wherein structures are secured or attached to one another either directly or indirectly through intervening structures, as well as both movable or rigid attachments or relationships, unless expressly described otherwise. Accordingly, the disclosure is not limited to such exemplary embodiments illustrating certain combinations of features that may exist alone or in combination with other features.

The present disclosure is directed toward fire resistant adhesive compositions which emit water vapor when exposed to fire. The inventive compositions are also able to form a hard glass film when exposed to high temperatures. In certain embodiments, the present invention includes a fire-resistant adhesive coating composition comprising an ionic polyacrylate dispersant; aluminum hydroxide; silicate; and an alkoxylated alcohol. In other embodiments, the invention includes methods of making a fire-resistant adhesive coating composition as described herein. In further embodiments, the invention is a method for producing a building panel comprising a fire-resistant adhesive coating composition as described herein.

The ionic polyacrylate dispersant may be in various forms. In certain embodiments, the ionic polyacrylate dispersant may be a salt. In certain embodiments, the ionic polyacrylate dispersant comprises an alkali metal. In certain embodiments, the alkali metal is selected from sodium or potassium. In certain embodiments, the salt is a sodium salt. In other embodiments, the salt is a potassium salt. In preferred embodiments, the ionic surfactant is sodium polyacrylate (commercially available as Nopcote 63900).

The ionic polyacrylate dispersant may be present at various amounts or concentrations. In certain embodiments, the ionic polyacrylate dispersant is present in an amount from about 0.01 wt. % to about 1.0 wt. %, based on the dry weight of the composition. For example, the ionic polyacrylate dispersant may be present in an amount of about 0.01 weight %, about 0.02 weight %, about 0.03 weight %, about 0.04 weight %, about 0.05 weight %, about 0.06 weight %, about 0.07 weight %, about 0.08 weight %, about 0.09 weight %, about 0.1 weight %, about 0.15 weight %, about 0.2 weight %, about 0.3 weight %, about 0.5 weight %, about 0.7 weight %, about 0.8 weight %, about 0.9 weight %, or about 1.0 weight %, based on the dry weight of the composition. In another example, the ionic polyacrylate dispersant may be present in an amount of from about 0.01% to about 0.8%, from about 0.01% to about 0.5%, from about 0.02 wt. % to about 0.5 wt. %, about 0.02% to about 0.2%, from about 0.02% to about 0.09%, about 0.02% to about 0.06%, or about 0.03% to about 0.08%, based on the dry weight of the composition. In further embodiments, the ionic polyacrylate dispersant is present in an amount of about 0.01% or more, about 0.02% or more, about 0.03% or more, up to about 1.0%, based on the dry weight of the composition. In further embodiments, the ionic polyacrylate dispersant is present in an amount of about 0.02% to about 0.2%, about 0.02% to about 0.1%, about 0.02% to about 0.08%, or about 0.02% to about 0.06%, based on the dry weight of the composition.

In some embodiments, the ionic polyacrylate dispersant is present in an amount from about 0.005 wt. % to about 1.0 wt. %, based on the wet weight of the composition. For example, the ionic polyacrylate dispersant may be present in an amount of about 0.005 wt. %, about 0.006 wt. %, about 0.007 wt. %, about 0.008 wt. %, about 0.009 wt. %. %, about 0.01 wt. %. %, about 0.02 wt. %. %, about 0.03 wt. %. %, about 0.04 wt. %. %, about 0.05 wt. %. %, about 0.06 wt. %. %, about 0.07 wt. %. %, about 0.08 wt. %. %, about 0.09 wt. %. %, about 0.1 wt. %. %, about 0.15 wt. %. %, about 0.2 wt. %. %, about 0.3 wt. %. %, about 0.5 wt. %. %, about 0.7 wt. %. %, about 0.8 wt. %. %, about 0.9 wt. %. %, or about 1.0 wt. %. %, based on the wet weight of the composition. In some embodiments, the ionic polyacrylate dispersant may be present in an amount from about 0.005 wt. % to about 0.9 wt. %, from about 0.005 wt. % to about 0.8 wt. %, from about 0.005 wt. % to about 0.7 wt. %, from about 0.005 wt. % to about 0.6 wt. %, from about 0.005 wt. % to about 0.5 wt. %, from about 0.005 wt. % to about 0.4 wt. %, from about 0.005 wt. % to about 0.3 wt. %, from about 0.005 wt. % to about 0.2 wt. %, from about 0.005 wt. % to about 0.1 wt. %, from about 0.005 wt. % to about 0.09 wt. %, from about 0.005 wt. % to about 0.08 wt. %, from about 0.005 wt. % to about 0.07 wt. %, from about 0.005 wt. % to about 0.06 wt. %, from about 0.005 wt. % to about 0.05 wt. %, from about 0.005 wt. % to about 0.04 wt. %, from about 0.005 wt. % to about 0.03 wt. %, or from about 0.005 wt. % to about 0.02 wt. %, based on the wet weight of the composition. In some embodiments, the ionic polyacrylate dispersant may be present in an amount from about 0.01 wt. % to about 0.9 wt. %, from about 0.01 wt. % to about 0.8 wt. %, from about 0.01 wt. % to about 0.7 wt. %, from about 0.01 wt. % to about 0.6 wt. %, from about 0.01 wt. % to about 0.5 wt. %, from about 0.01 wt. % to about 0.4 wt. %, from about 0.01 wt. % to about 0.3 wt. %, from about 0.01 wt. % to about 0.2 wt. %, from about 0.01 wt. % to about 0.1 wt. %, from about 0.01 wt. % to about 0.09 wt. %, from about 0.01 wt. % to about 0.08 wt. %, from about 0.01 wt. % to about 0.07 wt. %, from about 0.01 wt. % to about 0.06 wt. %, from about 0.01 wt. % to about 0.05 wt. %, from about 0.01 wt. % to about 0.04 wt. %, from about 0.01 wt. % to about 0.03 wt. %, or from about 0.01 wt. % to about 0.02 wt. %, based on the wet weight of the composition.

The aluminum hydroxide may act as a flame retardant filler. Aluminum hydroxide may be represented by the formula $Al(OH)_3$. In certain preferred embodiments, the aluminum hydroxide may be a solid. In certain embodiments, the solid aluminum hydroxide results in about 99.96% passing through a screen having 325 mesh. In certain embodiments, the aluminum hydroxide has a mean particle diameter of about 1.5 microns. In certain embodiments, the aluminum hydroxide has a surface area of about 10 $m^2$/gm. In certain embodiments, the aluminum hydroxide has a density of 2.42 $g/cm^3$. In certain embodiments, the aluminum hydroxide has an oil absorption of has an oil absorption from about 25 to about 45 ml/100 g, from about 30 to about 40 ml/100 g, or from about 33 to about 35 ml/100 g. In certain embodiments, the aluminum hydroxide has an oil absorption of about 33 to about 35 ml/100 g. Oil absorption is typically determined using boiled linseed oil.

The aluminum hydroxide may be present at various amounts or concentrations. In certain embodiments, the aluminum hydroxide may be present in an amount from about 15.0 wt. % to about 40.0 wt. %, based on the dry weight of the composition. For example, the aluminum hydroxide may be present in an amount of about 15.0 weight %, about 16.5 weight %, about 18.0 weight %, about 20.0 weight %, about 20.5 weight %, about 21.0 weight %, about 22.0 weight %, about 22.5 weight %, about 23.0 weight %, about 23.5 weight %, about 24.0 weight %, about 24.5 weight %, about 25.0 weight %, about 25.5 weight %, about 26.0 weight %, about 26.5 weight %, about 30.0 weight %, about 35.0 weight %, or about 40.0 weight %, based on the dry weight of the composition. In another example, the aluminum hydroxide may be present in an amount of from about 15% to about 35.0%, from about 18.5% to about 30.0%, from about 20.0% to about 28.5%, about 20.0% to about 27.0%, or about 22.0% to about 30.0%, based on the dry weight of the composition. In further embodiments, the aluminum hydroxide is present in an amount of about 15.0% or more, about 17.5% or more, about 20.0% or more, up to about 35.0%, based on the dry weight of the composition. In further embodiments, the aluminum hydroxide is present in an amount of about 20.0% to about 35.0%, about 20.0% to about 30.0%, about 22.0% to about 28.0%, from about 22.0% to about 28.0%, or about 22.0% to about 26.5%, based on the dry weight of the composition. In still further embodiments, the aluminum hydroxide is present in an amount of about 5.0% to about 25.0%, about 5.0% to about 20.0%, about 5.0% to about 15.0%, from about 7.0% to about 13.0%, or about 9.0% to about 13.0%, based on the wet weight of the composition. In certain embodiments, the aluminum hydroxide is present from about 20.0% to about 35.0%, from about 20.0% to about 30.0%, or from about 22.0% to about 28.0%, based on the dry weight of the composition.

The silicate may act as a binder. In certain embodiments, the silicate comprises an alkali metal. In certain embodiments, the alkali metal is selected from sodium or potassium. In certain embodiments, the alkali metal is potassium. In certain embodiments, the silicate has a specific gravity of about 1.39 $g/cm^3$. In certain embodiments, the silicate has a pH from about 11.0 to about 12.5, from about 11.5 to about 12.0, or about 11.7.

The silicate may be present at various amounts or concentrations. In certain embodiments, the silicate may be present in an amount from about 60.0 wt. % to about 85.0 wt. %, based on the dry weight of the composition. For example, the silicate may be present in an amount of about 60.0 weight %, about 61.5 weight %, about 63.0 weight %, about 65.0 weight %, about 67.5 weight %, about 70.0 weight %, about 72.0 weight %, about 73.0 weight %, about 73.3 weight %, about 74.0 weight %, about 76.5.0 weight %, about 78.5 weight %, about 80.0 weight %, about 82.5 weight %, about 84.0 weight %, or about 85.0 weight %, based on the dry weight of the composition. In another example, the silicate may be present in an amount of from about 65.0% to about 83.0%, from about 67.5% to about 80.0%, from about 69.0% to about 78.5%, about 70.0% to about 80.0%, or about 72.0% to about 80.0%, based on the dry weight of the composition. In further embodiments, the silicate is present in an amount of about 60.0% or more, about 64.5% or more, about 66.0% or more, up to about 80.0%, based on the dry weight of the composition. In further embodiments, the silicate is present in an amount of about 60.0% to about 80.0%, about 65.0% to about 85.0%, about 70.0% to about 80.0%, from about 70.0% to about 80.0%, or about 72.0% to about 80.5%, based on the dry weight of the composition.

In some embodiments, the silicate may be present in an amount from about 20 wt. % to about 45 wt. %, based on the wet weight of the composition. For example, the silicate may be present in an amount of about 20 wt. %, about 22.5 wt. %, about 25 wt. %, about 27.5 wt. %, about 30 wt. %, about 32 wt. %, about 34 wt. %, about 36 wt. %, about 38 wt. %, about 40 wt. %, about 42.5 wt. %, or about 45 wt. %, based on the wet weight of the composition. In some embodiments, the silicate may be present in an amount from about 20 wt. % to about 45 wt. %, from about 20 wt. % to about 42.5 wt. %, from about 20 wt. % to about 40 wt. %, from about 20 wt. % to about 38 wt. %, from about 20 wt. % to about 36 wt. %, from about 20 wt. % to about 34 wt. %, from about 20 wt. % to about 33 wt. %, from about 22.5 wt. % to about 45 wt. %, from about 22.5 wt. % to about 42.5 wt. %, from about 22.5 wt. % to about 40 wt. %, from about 22.5 wt. % to about 38 wt. %, from about 22.5 wt. % to about 36 wt. %, from about 22.5 wt. % to about 34 wt. %, from about 22.5 wt. % to about 33 wt. %, from about 25 wt. % to about 45 wt. %, from about 25 wt. % to about 42.5 wt. %, from about 25 wt. % to about 40 wt. %, from about 25 wt. % to about 38 wt. %, from about 25 wt. % to about 36 wt. %, from about 25 wt. % to about 34 wt. %, from about 25 wt. % to about 33 wt. %, from about 27.5 wt. % to about 45 wt. %, from about 27.5 wt. % to about 42.5 wt. %, from about 27.5 wt. % to about 40 wt. %, from about 27.5 wt. % to about 38 wt. %, from about 27.5 wt. % to about 36 wt. %, from about 27.5 wt. % to about 34 wt. %, from about 27.5 wt. % to about 33 wt. %, from about 30 wt. % to about 45 wt. %, from about 30 wt. % to about 42.5 wt. %, from about 30 wt. % to about 40 wt. %, from about 30 wt. % to about 38 wt. %, from about 30 wt. % to about 36 wt. %, from about 30 wt. % to about 34 wt. %, from about 30 wt. % to about 33 wt. %, from about 31 wt. % to about 45 wt. %, from about 31 wt. % to about 42.5 wt. %, from about 31 wt. % to about 40 wt. %, from about 31 wt. % to about 38 wt. %, from about 31 wt. % to about 36 wt. %, from about 31 wt. % to about 34 wt. %, from about 31 wt. % to about 33 wt. %, from about 32 wt. % to about 45 wt. %, from about 32 wt. % to about 42.5 wt. %, from about 32 wt. % to about 40 wt. %, from about 32 wt. % to about 38 wt. %, from about 32 wt. % to about 36 wt. %, from about 32 wt. % to about 34 wt. %, or from about 32 wt. % to about 33 wt. %, based on the wet weight of the composition. In some embodiments, the silicate is present in an amount of about 20 wt. % or more, about 22.5 wt. % or more, about 25 wt. % or more, about 27.5 wt. % or more, about 30 wt. % or more, about 31 wt. % or more, about 32 wt. % or more, up to about 45 wt. %, based on the wet weight of the composition.

The alkoxylated alcohol may act as a wetting agent. In certain preferred embodiments, the alkoxylated alcohol is non-ionic. In certain embodiments, the alkoxylated alcohol is ethoxylated. In certain embodiments, the alkoxylated alcohol is propoxylated. In certain embodiments, the alkoxylated alcohol is ethoxylated and propoxylated. In certain embodiments, the alkoxylated alcohol comprises $C_6$ to $C_{12}$ alcohols. In certain embodiments, the alkoxylated alcohol comprises $C_6$ to $C_{10}$ alcohols. In certain embodiments, the alkoxylated alcohol comprises $C_8$ to $C_{12}$ alcohols. In certain preferred embodiments, the alkoxylated alcohol comprises $C_8$ to $C_{10}$ alcohols. In certain preferred embodiments, the alkoxylated alcohol is non-ionic, is ethoxylated and propoxylated, and comprises $C_8$ to $C_{10}$ alcohols. In certain embodiments, the alkoxylated alcohol has a pH from about 6.0 to about 8.0. In certain embodiments, the alkoxylated alcohol has an initial boiling point of about 200° C. In certain embodiments, the alkoxylated alcohol has a pH from about 6.0 to about 8.0 and has an initial boiling point of about 200° C.

The alkoxylated alcohol may be present at various amounts or concentrations. In certain embodiments, the alkoxylated alcohol may be present in an amount from about 0.7 wt. % to about 3.0 wt. %, based on the dry weight of the composition. For example, the alkoxylated alcohol may be present in an amount of about 0.7 weight %, about 0.9 weight %, about 1.0 weight %, about 1.1 weight %, about 1.5 weight %, about 1.8 weight %, about 2.0 weight %, about 2.2 weight %, about 2.5 weight %, about 2.8 weight %, or about 3.0 weight %, based on the dry weight of the composition. In another example, the alkoxylated alcohol may be present in an amount of from about 0.7% to about 2.5%, from about 0.7% to about 2.0%, from about 0.9% to about 2.5%, about 0.9% to about 2.0%, or about 0.9% to about 1.3%, based on the dry weight of the composition. In further embodiments, the alkoxylated alcohol is present in an amount of about 0.7% or more, about 0.9% or more, about 1.0% or more, up to about 2.1%, based on the dry weight of the composition. In further embodiments, the alkoxylated alcohol is present in an amount of about 0.7% to about 2.0%, from about 0.9% to about 1.5%, or from about 0.9% to about 1.3%, based on the dry weight of the composition. In yet further embodiments, the alkoxylated alcohol is present from about 0.2% to about 1.0%, from about 0.2% to about 0.8%, or from about 0.2% to about 0.6%, based on the wet weight of the composition.

The fire-resistant adhesive compositions of the present invention may be used to adhere two or more materials. In certain embodiments, the materials may include, but is not limited to, a substrate to a scrim, a substrate to a veneer, a substrate to a substrate, a substrate to a building structure, or a substrate to a coating. In certain embodiments, the materials may be wood, fibers, or ceramic. In certain embodiments, the materials may be building materials. Certain non-limiting examples include ceiling panels, wall panels, and floor panels. The panels may be made of any building material. For example, the building materials may include fiber, filler, and combinations thereof. The fibers may be organic fibers, inorganic fibers, or a blend thereof. Non-limiting examples of inorganic fibers mineral wool (also referred to as slag wool), rock wool, stone wool, and glass fibers. Non-limiting examples of organic fiber include fiber-glass, cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof.

The fire-resistant adhesive composition is typically prepared by mixing components within an aqueous liquid solvent. In certain embodiments, the aqueous liquid is water. The combined components and aqueous liquid may have various solids amount or concentration. In other words, this process yields an adhesive composition having wet solid content. The combined components and aqueous liquid may be applied, or coated, on one or more sides of a material and heated at a temperature sufficient to evaporate the solvent. This process yields an adhesive composition having dry solid content.

The solids content of the wet composition may be present at various amounts or concentrations. In certain embodiments, the composition has a solids content of at least about 44.2%, based on the wet weight of the composition. In certain embodiments, the solids content may be present in an amount from about 44.0% to about 85%, from about 44.0% to about 70%, or from about 44.2 wt. % to about 65.0 wt. %, based on the wet weight of the composition. For example, the solids content may be present in an amount of about 44.2 weight %, about 45.0 weight %, about 45.5 weight %, about 46.0 weight %, about 46.5 weight %, about 47.0 weight %, about 47.5 weight %, about 48.0 weight %, about 48.5 weight %, about 49.0 weight %, about 50.0 weight %, about 53.0 weight %, about 55.0 weight %, about 58.5 weight %, about 60.0 weight %, or about 65.0 weight %, based on the wet weight of the composition. In another example, the solids content may be present in an amount of from about 44.2% to about 60.0%, from about 44.2% to about 55.0%, from about 44.2% to about 52.5%, about 44.2% to about 50.0%, or about 44.2% to about 48.5%, based on the wet weight of the composition. In further embodiments, the solids content is present in an amount of about 44.2% or more, about 45.0% or more, about 46.0% or more, up to about 60.0%, based on the wet weight of the composition. In further embodiments, the solids content is present in an amount of about 44.2% to about 62.5%, about 44.2% to about 58.5%, about 44.2% to about 55.5%, or about 44.2% to about 50.0%, based on the wet weight of the composition. In further embodiments, the solids content is present in an amount of about 44.2%, based on the wet weight of the composition.

In certain aspects of the invention, a rheology modifier may be used. In certain aspects, the rheology modifier comprises bentonite. Bentonite is an absorbent aluminum phyllosilicate. Bentonite can include impure clay including montmorillonite. The bentonite can consist essentially of potassium (K), sodium (Na), calcium (Ca), and aluminum (Al) such that the properties of one of these specific elements dominates the properties of the bentonite. For example, in one embodiment, the bentonite is sodium bentonite. In another embodiment, the bentonite is calcium bentonite. In another embodiment, the bentonite is potassium bentonite. The bentonite may be in solution, dry, or in a colloidal suspension.

In certain embodiments, the rheology modifier may be present in an amount from about 0.0 wt. % to about 15.0 wt. %, based on the dry weight of the composition. For example, the rheology modifier may be present in an amount of about 0.0 weight %, about 0.1 weight %, about 0.2 weight %, about 0.3 weight %, about 0.4 weight %, about 0.5 weight %, about 0.7 weight %, about 1.0 weight %, about 1.5 weight %, about 2.5 weight %, about 5.0 weight %, about 7.5 weight %, about 12.5 weight %, or about 15.0 weight %, based on the dry weight of the composition. In another example, the rheology modifier may be present in an amount of from about 0.1% to about 12.5%, from about 0.1% to about 10.0%, from about 0.2% to about 7.5%, about 0.2% to about 5.0%, or about 0.1% to about 3.5%, based on the dry weight of the composition. In further embodiments, the rheology modifier is present in an amount of about 0.0% or more, about 0.1% or more, about 0.3% or more, about 0.5% or more, up to about 3.5%, based on the dry weight of the composition. In further embodiments, the rheology modifier is present in an amount of about 0.0% to about 2.3%, about 0.1% to about 2.0%, about 0.3% to about 1.5%, or about 0.3% to about 1.2%, based on the dry weight of the composition.

The invention further includes a method for producing a building panel comprising a fire-resistant adhesive coating composition, the method comprising coating a building panel with the fire-resistant adhesive coating composition and drying the fire-resistant adhesive coating composition to evaporate the aqueous liquid solvent. In certain embodiments, the drying is performed with addition of heat. The temperature and time needed to dry the coating composition may vary. In preferred embodiments, the drying step will produce a coating composition having less than 1%, less than 0.8%, or less than 0.5%, by weight of the composition, of liquid carrier. In other words, the drying step will produce a coating composition having greater than 99.0%, greater than 99.2%, or greater than 99.5%, by weight of the composition, of solids.

The invention further contemplates a method for making a fire-resistant adhesive coating composition as described herein, the method comprising mixing the components in an aqueous solvent. In certain preferred embodiments, the coating composition has a solids content of at least about 44.2%, based on the wet weight of the composition. In other embodiments, the coating composition has a solids content from about 44.0% to about 85%, about 44.0% to about 70%, or about 44.2% to about 65%, based on the wet weight of the composition.

The following examples are prepared in accordance with the present invention. The present invention is not limited to the examples described herein.

EXAMPLES

The examples and other implementations described herein are exemplary and not intended to be limiting in describing the full scope of compositions and methods of this disclosure. Equivalent changes, modifications and variations of specific implementations, materials, compositions, and methods may be made within the scope of the present disclosure, with substantially similar results.

Example 1: an exemplary fire-resistant adhesive composition (Composition 1) was prepared as shown in Table 1.

TABLE 1

Exemplary fire-resistant adhesive composition.

| Component | Function | Raw material wet wt. % | Solid wt. % based on wet weight of composition | Dry wt. % |
|---|---|---|---|---|
| Water | Solvent | 5.67 (0% solid) | 0.00 | 0.00 |
| Potassium silicate, pH about 11.7 | Inorganic resin, Binder | 82.52 (39.2% solid) | 32.35 | 73.27 |
| Aluminum Hydroxide | Flame retardant filler | 11.33 (100% solid) | 11.33 | 25.67 |
| Ethoxylated propoxylated C8-C10 alcohols, Alkoxylated alcohol, Linear alcohol ethoxylate, boiling point 200° C., pH 6.0 to 8.0 at 20-25° C. | Wetting Agent, Non-Ionic surfactant | 0.45 (100% solid) | 0.45 | 1.03 |
| Sodium polyacrylate, ionic dispersant | Dispersant | 0.03 (45% solid) | 0.014 | 0.03 |
| Total | | 100 | | 100 |
| Calculated coating solids, % | | 44.15 | 44.15 | |

Example 2: Two compositions were prepared using the materials as described in Table 1, except having various solids amounts. Composition 2 had a solids content of 43.7% solids, based on the wet weight of the composition. Composition 3 had a solids content of 44.2% solids, based on the wet weight of the composition. The different solids amounts were achieved by including different amounts of water while maintaining the same relative weight ratios of the solid components. Viscosity of the compositions was analyzed over a 35 day experimental period. The results are reported in Table 2.

TABLE 2

Viscosity Stability.

| Day | Viscosity of Composition 2 (cps) | Viscosity of Composition 3 (cps) |
|---|---|---|
| 0 | 720 | 864 |
| 1 | 680 | 776 |
| 2 | 684 | 836 |
| 4 | 732 | 904 |
| 7 | 776 | 924 |
| 10 | 760 | 992 |
| 14 | 788 | 1016 |
| 21 | 776 | 1060 |
| 28 | 768 | 1000 |
| 35 | 792 | 1096 |

The results reported in Table 2 demonstrate that Composition 3, which had a solids content of 44.2%, exemplified a stable and high viscosity profile over a 35 day period. Such surprising and unexpected high viscosity allows for the solid components to remain suspended without precipitating over time. Such surprising and unexpected characteristics provide for a stable fire-resistant adhesive product composition. In contrast, Composition 2, which had a solids content of 43.7%, resulted in a lower viscosity profile and exemplified higher instability.

Example 3: characterization of performance under heat stress. Composition 3 was further characterized under heat stress using a cone calorimeter test. The composition was compared against a commercially available white water based polyvinyl acetate emulsion adhesive (Comparative composition 1). The two adhesive compositions were applied and cured on 100×100 cm calcium silicide (CaSi) specimen with the same dry amount. Testing analysis followed ASTM E1354 protocol for a specimen that does not ignite. Results are shown in Table 3 below.

TABLE 3

Cone calorimeter testing.

| | Comp. Composition 1 | Composition 3 |
|---|---|---|
| Total heat release (MJ/m$^2$) | 4.5 | 3.5 |
| Ave. heat release rate (kW/m$^2$) | 13.58 | 1.77 |
| Total smoke release (m$^2$/m$^2$) | 78.7 | 13.0 |
| Total smoke production (m$^2$) | 0.8 | 0.1 |

Comparative composition 1 was consumed in about 3 minutes and therefore, testing was complete by about 5 minutes. By contrast, Composition 3 was able to undergo characterization testing up to 30 minutes. Surprisingly and unexpectedly, Composition 3 provided for superior total smoke release and production levels.

Example 4: adhesion performance characterization between various substrates. Briefly, to determine the maximum force of shear, two 2×2 inch sized boards made of either solid poplar wood or medium-density fiberboard (MDF) were stuck together with 0.5"×2" overlays of adhesive Composition 3. When using of two MDF boards, the max force was about 1.47 kN. When using two solid wood boards, the max force was about 1.18 kN. For one piece of solid wood with one piece of MDF, the max force was about 0.9 kN.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A fire-resistant adhesive coating composition comprising:
    an ionic polyacrylate dispersant;
    aluminum hydroxide present from about 20.0% to about 35.0%, based on the total dry weight of the composition;
    potassium silicate present from about 65.0% to about 85.0%, based on the total dry weight of the composition; and
    alkoxylated alcohol.

2. The fire-resistant adhesive coating composition of claim 1, wherein the composition has a solids content from about 44.0% to about 85% based on the wet weight of the composition.

3. The fire-resistant adhesive coating composition of claim 1, wherein the ionic polyacrylate dispersant comprises an alkali metal.

4. The fire-resistant adhesive coating composition of claim 3, wherein the alkali metal is selected from sodium or potassium.

5. The fire-resistant adhesive coating composition of claim 1, wherein the ionic polyacrylate dispersant is present from about 0.02% to about 0.2%, based on the dry weight of the composition.

6. The fire-resistant adhesive coating composition of claim 1, wherein the silicate is present from about 70.0% to about 80.0%, based on the dry weight of the composition.

7. The fire-resistant adhesive coating composition of claim 1, wherein the silicate has a pH from about 11.0 to about 12.5.

8. The fire-resistant adhesive coating composition of claim 1, wherein the aluminum hydroxide is present from about 20.0% to about 30.0%, based on the dry weight of the composition.

9. The fire-resistant adhesive coating composition of claim 1, wherein the aluminum hydroxide has an oil absorption from about 25 to about 45 ml/100 g.

10. The fire-resistant adhesive coating of claim 1, wherein the alkoxylated alcohol is non-ionic.

11. The fire-resistant adhesive coating composition of claim 1, wherein the alkoxylated alcohol comprises $C_8$ to $C_{10}$ alcohols.

12. The fire-resistant adhesive coating composition of claim 1, wherein the alkoxylated alcohol has a pH from about 6.0 to about 8.0 and has an initial boiling point of about 200° C.

13. The fire-resistant adhesive coating composition of claim 1, wherein the alkoxylated alcohol is present from about 0.7% to about 2.0%, based on the dry weight of the composition.

14. A building panel comprising the composition of claim 1, wherein the panel is made of wood.

15. The fire-resistant adhesive coating composition of claim 1, further comprising a rheology modifier present in an amount of up to about 15.0 wt. %, based on the dry weight of the composition.

16. The fire-resistant adhesive coating composition of claim 15, wherein the rheology modifier comprises bentonite clay.

17. A method for producing a building panel comprising a fire-resistant adhesive coating composition, the fire-resistant adhesive coating composition comprising:
    an aqueous liquid solvent;
    an ionic polyacrylate dispersant;
    aluminum hydroxide present from about 20.0% to about 35.0% based on the total dry weight of the composition;
    potassium silicate present from about 65.0% to about 85.0%, based on the total dry weight of the composition; and
    alkoxylated alcohol,
    the method comprising:
    i) coating a building panel with the fire-resistant adhesive coating composition; and
    ii) drying the fire-resistant adhesive coating composition to evaporate the aqueous liquid solvent;
    wherein the coating composition has a solids content of at least about 44.0%, based on the wet weight of the composition.

18. The method of claim 17, wherein the ionic polyacrylate dispersant comprises an alkali metal, and wherein the alkali metal is selected from sodium or potassium.

* * * * *